United States Patent
Henze et al.

(10) Patent No.: US 8,252,253 B2
(45) Date of Patent: Aug. 28, 2012

(54) PROCESS FOR RECOVERING RUTHENIUM FROM USED RUTHENIUM OXIDE-COMPRISING CATALYSTS

(75) Inventors: Guido Henze, Buerstadt (DE); Heiko Urtel, Frankenthal (DE); Martin Sesing, Waldsee (DE); Martin Karches, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/142,915

(22) PCT Filed: Dec. 28, 2009

(86) PCT No.: PCT/EP2009/067939
§ 371 (c)(1),
(2), (4) Date: Jun. 30, 2011

(87) PCT Pub. No.: WO2010/076297
PCT Pub. Date: Jul. 8, 2010

(65) Prior Publication Data
US 2011/0286898 A1    Nov. 24, 2011

(30) Foreign Application Priority Data
Dec. 30, 2008  (EP) .................................... 08173096

(51) Int. Cl.
*C01G 55/00* (2006.01)
(52) U.S. Cl. ......................................................... 423/22
(58) Field of Classification Search .................. 423/22; 502/24
See application file for complete search history.

(56) References Cited

U.S. PATENT DOCUMENTS

| 4,359,400 | A * | 11/1982 | Landolt et al. ............... 502/53 |
| 2008/0293836 | A1 * | 11/2008 | Schubert et al. ............. 518/715 |
| 2010/0055011 | A1 | 3/2010 | Hirai et al. |

FOREIGN PATENT DOCUMENTS

| DE | 10 2005 061954 | 7/2007 |
| EP | 0 743 277 | 11/1996 |
| EP | 0 767 243 | 4/1997 |
| GB | 1 046 313 | 10/1966 |
| JP | 58 194745 | 11/1983 |
| JP | 03 013531 | 1/1991 |
| JP | 2002 206122 | 7/2002 |
| WO | 2008 062785 | 5/2008 |

OTHER PUBLICATIONS

International Search Report issued Aug. 9, 2011 in PCT/EP09/067939 filed Dec. 28, 2009.
U.S. Appl. No. 13/142,786, filed Jun. 29, 2011, Henze, et al.
U.S. Appl. No. 13/142,462, filed Jun. 28, 2011, Henze, et al.
U.S. Appl. No. 13/146,487, filed Jul. 27, 2011, Linsenbuehler, et al.

* cited by examiner

*Primary Examiner* — Patricia L Hailey
*Assistant Examiner* — Melissa Stalder
(74) *Attorney, Agent, or Firm* — Oblon, Spivak, McClelland, Maier & Neustadt, L.L.P.

(57) ABSTRACT

The invention relates to a process for recovering ruthenium from a used ruthenium-comprising catalyst which comprises ruthenium as ruthenium oxide on a support material which is not readily soluble in mineral acid, which comprises the steps:

a) the ruthenium oxide-comprising catalyst is reduced in a gas stream comprising hydrogen chloride and, if appropriate, an inert gas at a temperature of from 300 to 500° C.;

b) the reduced catalyst from step a) comprising metallic ruthenium on the sparingly soluble support material is treated with hydrochloric acid in the presence of an oxygen-comprising gas, with the metallic ruthenium present on the support being dissolved as ruthenium(III) chloride and obtained as an aqueous ruthenium(III) chloride solution;

c) if appropriate, the ruthenium(III) chloride solution from step b) is worked up further.

20 Claims, No Drawings

PROCESS FOR RECOVERING RUTHENIUM FROM USED RUTHENIUM OXIDE-COMPRISING CATALYSTS

The invention relates to a process for recovering ruthenium from used ruthenium oxide-comprising catalysts.

In the process developed by Deacon in 1868 for the catalytic oxidation of hydrogen chloride, hydrogen chloride is oxidized by means of oxygen in an exothermic equilibrium reaction to form chlorine. EP-A 0 743 277 discloses such a process for the catalytic oxidation of hydrogen chloride, in which a ruthenium-comprising supported catalyst is used. Ruthenium is in this case applied in the form of ruthenium chloride, ruthenium oxychlorides, chlororuthenate complexes, ruthenium hydroxide, ruthenium-amine complexes or further ruthenium complexes to the support. According to GB 1,046,313, ruthenium(III) chloride on aluminum oxide is used as catalyst in a process for the catalytic oxidation of hydrogen chloride.

γ-Aluminum oxide is usually used as aluminum oxide support.

Used noble metal catalysts comprising platinum group metals on γ-aluminum oxide as support are generally treated by hydrometallurgical processes to recover the noble metals. Here, the γ-aluminum oxide support is dissolved in sodium hydroxide solution or sulfuric acid, with the noble metal remaining as undissolved residue. This type of recovery requires the used catalysts to have a low carbon content. Noble metal catalysts having a high carbon content and catalysts which comprise noble metals on insoluble supports such as α-aluminum oxide, silicon dioxide or zeolite are processed in pyrometallurgical processes to recover the noble metals. In pyrometallurgical processes, the catalyst is converted into a melt at temperatures of >1300° C. and is subsequently separated into its elemental constituents. See also Hydrocarbon Engineering July 2003, pages 48-53, and Hydrocarbon Engineering March 2004, pages 31-36. The recovery of noble metals from used, noble metal-comprising catalysts by pyrometallurgical processes is complicated and expensive.

A disadvantage of the processes for the catalytic oxidation of hydrogen chloride which employ catalysts based on γ-aluminum oxide is the low mechanical strength of the catalysts. This results in high attrition and fine dust formation. For this reason, noble metal catalysts comprising ruthenium on α-aluminum oxide as support have recently also been used in the catalytic oxidation of hydrogen chloride. Since a-aluminum oxide is insoluble both in sodium hydroxide solution and in sulfuric acid, the recovery of ruthenium from the used, α-aluminum oxide-comprising catalysts by hydrometallurgical processes is ruled out.

JP 03-013531 discloses a process for recovering ruthenium from residues comprising ruthenium or ruthenium oxide. Here, the residues are reacted hot with gaseous chlorine to form ruthenium chloride. The volatile ruthenium chloride is subsequently passed through a barium chloride solution and collected as water-soluble $BaRuCl_5$.

JP 58-194745 discloses a process for recovering ruthenium, in which ruthenium oxides present on a corrosion-resistant support are firstly reduced to metallic ruthenium and subsequently converted into soluble alkali metal ruthenates.

JP 2002-206122 relates to a process in which ruthenium is recovered from ruthenium-comprising mixed oxides comprising further metals. The ruthenium-comprising mixed oxide is reduced, resulting in ruthenium and the further metals being reduced. The further metals which are different from ruthenium are subsequently dissolved by acid treatment, with the ruthenium remaining as insoluble residue and being isolated by filtration.

DE-A 10 2005 061 954 describes a process for recovering ruthenium from a used ruthenium-comprising catalyst which comprises ruthenium oxide on a support material, in which process the ruthenium oxide present on the support is reduced to metallic ruthenium in a first step and the metallic ruthenium present on the support is subsequently dissolved as ruthenium (III) chloride by means of hydrochloric acid in the presence of an oxygen-comprising gas.

The use of hydrogen requires a separate process step. In addition, the deactivated catalyst has to be installed in a separate reduction oven.

It is an object of the invention to provide a process for recovering ruthenium from ruthenium-comprising catalysts which comprise ruthenium in oxidic form on ceramic support materials which are not readily soluble in mineral acids. The process should be simple to carry out and inexpensive.

The object is achieved by a process for recovering ruthenium from a used ruthenium-comprising catalyst which comprises ruthenium as ruthenium oxide on a support material which is not readily soluble in mineral acid, which comprises the steps:

a) the ruthenium oxide-comprising catalyst is reduced in a gas stream comprising hydrogen chloride and, if appropriate, an inert gas at a temperature of from 300 to 500° C.;
b) the reduced catalyst from step a) is treated with hydrochloric acid in the presence of an oxygen-comprising gas, with the metallic ruthenium present on the support being dissolved as ruthenium(III) chloride and obtained as an aqueous ruthenium(III) chloride solution;
c) if appropriate, the ruthenium(III) chloride solution from step b) is worked up further.

It has been found that $RuO_2$ can be reduced by means of hydrogen chloride. It is assumed that the reduction occurs via $RuCl_3$ to elemental ruthenium. Thus, if a ruthenium oxide-comprising catalyst is treated with hydrogen chloride, ruthenium oxide is presumably reduced quantitatively to ruthenium after a sufficiently long treatment time.

The separate reduction step using hydrogen is thus dispensed with. The used catalyst can be reduced in the reactor in which the oxidation of hydrogen chloride is carried out. The catalyst does not have to be installed in a separate reduction oven.

Suitable sparingly soluble support materials which can be treated by the process of the invention are, for example, α-aluminum oxide, silicon dioxide, titanium dioxide (rutile and anatase $TiO_2$, preferably rutile $TiO_2$), zirconium dioxide, zeolite and graphite. The preferred support is α-aluminum oxide.

The process of the invention is preferably used for recovering ruthenium from exhausted ruthenium-comprising catalysts which have been used in the Deacon process and comprise α-aluminum oxide as support, possibly in admixture with further support materials. In general, the support consists essentially of α-aluminum oxide, but can comprise further support materials, for example graphite, silicon dioxide, titanium dioxide and/or zirconium dioxide, preferably titanium dioxide and/or zirconium dioxide. In general, this catalyst is used in the catalytic oxidation of hydrogen chloride at a temperature above 200° C., preferably above 350° C. The reaction temperature is generally not more than 600° C., preferably not more than 500° C.

In the catalytic process, which is also known as the Deacon process, hydrogen chloride is oxidized by means of oxygen in an exothermic equilibrium reaction to form chlorine, with water vapor also being obtained. Oxygen is usually used in superstoichiometric amounts. For example, a two- to fourfold excess of oxygen is customary. Since no decreases in selectivity have to be feared, it can be economically advantageous to work at relatively high pressures and accordingly at residence times which are longer than at atmospheric pressure.

Customary reaction apparatuses in which the catalytic oxidation of hydrogen chloride is carried out are fixed-bed and fluidized-bed reactors. The oxidation of hydrogen chloride can be carried out in a plurality of stages.

The catalytic oxidation of hydrogen chloride can be carried out adiabatically or preferably isothermally or approximately isothermally, discontinuously or preferably continuously, as a moving-bed or fixed-bed process. It is preferably carried out in a fluidized-bed reactor at a temperature of from 320 to 400° C. and a pressure of from 2 to 8 bar.

In the isothermal or approximately isothermal mode of operation, it is also possible to use a plurality of, i.e. from 2 to 10, preferably from 2 to 6, particularly preferably from 2 to 5, in particular 2 or 3, reactors connected in series with additional intermediate cooling. The oxygen can either all be added together with the hydrogen chloride upstream of the first reactor or its addition is distributed over the various reactors. This connection of individual reactors in series can also be combined in one apparatus.

One embodiment comprises using a structured catalyst bed in which the catalyst activity increases in the flow direction in the fixed-bed reactor. Such structuring of the catalyst bed can be effected by different impregnation of the catalyst supports with active composition or by different dilution of the catalyst with an inert material. As inert material, it is possible to use, for example, rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable shaped catalyst bodies are any shapes, with preference being given to pellets, rings, cylinders, stars, wagon wheels or spheres, particularly preferably rings, cylinders or star extrudates.

The catalyst can also be used as fluidized-bed catalyst in the form of powder having an average particle size of from 10 to 200 microns. The catalyst is preferably used as fluidized-bed catalyst.

The supported ruthenium catalysts can, for example, be obtained by impregnating the support material with aqueous solutions of $RuCl_3$ and optionally a promoter for doping, preferably in the form of their chlorides. The shaping of the catalyst can be carried out after or preferably before impregnation of the support material.

Suitable promoters for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praesiodymium and neodymium, preferably scandium, yttrium, lanthanum and cerium, particularly preferably lanthanum and cerium, or mixtures thereof.

After impregnation and doping, the support material may be dried and optionally calcined at temperatures of from 100 to 500° C., preferably from 100 to 400° C., for example under a nitrogen, argon or air atmosphere. Preference is given to firstly drying the support material at from 100 to 200° C. and subsequently calcining it at from 200 to 400° C.

The volume ratio of hydrogen chloride to oxygen at the reactor inlet is generally in the range from 1:1 to 20:1, preferably from 2:1 to 8:1, particularly preferably from 2:1 to 5:1.

The ruthenium-comprising catalysts which are worked up by the process of the invention are usually obtained by impregnating the support material with aqueous solutions of ruthenium salts, with shaping of the catalyst being carried out after or preferably before impregnation of the support material. The catalysts can also be used as fluidized-bed catalysts in the form of powder having average particle sizes of from 10 to 200 μm. As fixed-bed catalysts, they are generally used in the form of shaped catalyst bodies. After impregnation, the shaped bodies or powders are usually dried and subsequently calcined at temperatures of from 100 to 400° C. in an air, nitrogen or argon atmosphere, preferably an air atmosphere. The shaped bodies or powders are preferably firstly dried at from 100 to 150° C. and subsequently calcined at from 200 to 400° C. During calcination, the oxides are formed from the chlorides.

A particular advantage of the process of the invention for recovering ruthenium from ruthenium-comprising supported catalysts is the fact that ruthenium can be recovered in the form of an aqueous ruthenium(III) chloride solution. This ruthenium(III) chloride solution can subsequently be used for producing fresh catalyst by applying it to fresh support material, followed by drying and, if appropriate, calcination of the impregnated support.

In general, the ruthenium concentration of the impregnation solution is from 1 to 10% by weight, preferably from 2 to 6% by weight. If the ruthenium(III) chloride solution is obtained in a lower concentration in step b) of the process of the invention, a concentration step then preferably follows.

In a first step a), the catalyst is reduced by means of a gas stream comprising hydrogen chloride and optionally an inert gas at a temperature of from 300 to 500° C., preferably from 330 to 450° C. and particularly preferably from 380 to 430° C. The hydrogen chloride-comprising gas stream can further comprise inert gases such as nitrogen or argon or further noble gases. In general, the gas stream comprises at least from 10 to 100% by volume of hydrogen chloride. The amount of gas used is generally from 0.1 to 1 kg of gas per kg of catalyst. The treatment time is, for example, from 1 to 36 h.

The oxidation of ruthenium in step b) is preferably carried out in concentrated hydrochloric acid having a hydrogen chloride content of from 20 to 37% by weight, for example about 32% by weight. The oxygen is carried out in the presence of an oxygen-comprising gas, preferably air. For example, the sparingly soluble support comprising metallic ruthenium can be placed in an autoclave together with concentrated hydrochloric acid and air can be passed into this solution. To limit the solution volume, gaseous hydrogen chloride can be additionally passed in. The dissolution of the metallic ruthenium usually occurs at an elevated temperature of generally from 60 to 150° C., for example at about 100° C.

The ruthenium(III) chloride-comprising aqueous solution obtained may optionally comprise further metals in the form of their chlorides. These further metals can originate from the reactor material and have got into the catalyst as a result of abrasion (for example nickel from nickel-comprising steels) or have been comprised as further active metals in addition to ruthenium in the ruthenium-comprising catalyst. Thus, the ruthenium-comprising catalyst can comprise, for example, further noble metals selected from among palladium, platinum, osmium, iridium, copper, silver, gold or rhenium. These further metals can be partly or completely separated off by customary methods in an optional work-up step c). Suitable processes are described in Beck, Edelmetall-Taschenbuch, 2nd edition, Heidelberg: Hüthig 1995, and also Winnacker-Küchler, Chemische Technologie, 4th edition, volume 4, pages 540 to 572.

In an embodiment of the invention, the ruthenium-comprising catalyst comprises nickel as further metal. Step b) then results in a solution which comprises not only ruthenium (III) chloride but also nickel in dissolved form. This solution is subsequently, if appropriate after concentration, used for producing fresh supported rutheniuim catalyst.

A used, deactivated fluidized-bed Deacon catalyst can, for example, comprise up to 2.5% by weight of nickel as nickel chloride. If the catalyst is therefore reduced in situ in the reactor using gaseous HCl, the reduced catalyst also comprises 2.5% by weight of nickel chloride. Work-up of this catalyst without prior washing out of the nickel chloride with water then gives an aqueous solution comprising ruthenium and nickel. This solution can be used without prior work-up for the preparation of a fresh catalyst, with nickel as dopant improving the activity of the catalyst.

The invention is illustrated by the following examples.

EXAMPLES

Example 1

585 g of a used and deactivated fluidized-bed catalyst (2% of $RuO_2$ on $\alpha$-$Al_2O_3$, d=50 μm) are treated with 100 standard l/h of gaseous HCl at 430° C. for 70 hours in a fluidized-bed reactor having a diameter of 44 mm, a height of 990 mm and a bed height of from 300 to 350 mm. The reduced catalyst obtained in this way is treated with 2000 ml of a 20% strength HCl solution at 100° C. in a 2500 ml glass reactor for 96 hours while stirring vigorously. 20 standard l/h of air are bubbled in during the treatment time. The supernatant Ru-comprising solution is separated off from the solid (support) by filtration and the filtercake is washed with 500 ml of water. The combined aqueous phases comprise >98% of the ruthenium. The aqueous solution can subsequently be worked up further.

Example 2

585 g of a used and deactivated fluidized-bed catalyst comprising 2% by weight of $RuO_2$ on alpha-$Al_2O_3$ (average diameter ($d_{50}$): 50 μm) and, as a result of corrosion and erosion of the nickel-comprising reactor, 2.5% by weight of nickel chloride are treated with 100 standard l/h of gaseous HCl at 430° C. in the fluidized-bed reactor described in example 1 for 70 hours. The reduced catalyst obtained in this way is treated with 2000 ml of a 20% strength HCl solution at 100° C. for 96 hours in a 2500 ml glass reactor while stirring vigorously. 20 standard l/h of air are bubbled in during the entire treatment time. The supernatant Ru- and Ni-comprising solution is separated off from the solid (support) by filtration and the filtercake is washed with 500 ml of water. The combined aqueous phases comprise >98% of the ruthenium and the nickel. Evaporation of part of this solution to 18 ml gives a solution comprising 4.2% by weight of ruthenium and 7.0% by weight of nickel. This is sprayed onto 50 g of $\alpha$-$Al_2O_3$ (powder, average diameter ($d_{50}$): 50 μm) in a rotating glass flask and the moist solid is subsequently dried at 120° C. for 16 hours. The dried solid is subsequently calcined at 380° C. in air for 2 hours.

2 g of this catalyst are mixed with 118 g of $\alpha$-$Al_2O_3$ and 9.0 standard l/h of HCl and 4.5 standard l/h of $O_2$ are passed through it from below via a glass frit at 360° C. in a fluidized-bed reactor (d=29 mm; height of the fluidized bed: 20-25 cm) and the HCl conversion is determined by passing the resulting gas stream into a potassium iodide solution and subsequently titrating the iodine formed with a sodium thiosulfate solution. An HCl conversion of 40.0% is found. A comparable catalyst which is free of nickel and has been prepared analogously from a fresh ruthenium chloride solution gives a conversion of 37.7%.

The invention claimed is:

1. A process for recovering ruthenium from a ruthenium-comprising catalyst, the process comprising:
   a) reducing a ruthenium comprising catalyst comprising ruthenium oxide on a support, in a gas stream comprising hydrogen chloride and, optionally, an inert gas at a temperature of from 300 to 500° C., to give a reduced catalyst comprising metallic ruthenium present on the support;
   b) treating the reduced catalyst from a) with hydrochloric acid in the presence of an oxygen-comprising gas, wherein the metallic ruthenium present on the support is dissolved as ruthenium(III) chloride and obtained as an aqueous ruthenium(III) chloride solution;
   c) optionally, further working up the ruthenium(III) chloride solution from b),
   wherein the support material is not readily soluble in mineral acid.

2. The process of claim 1, wherein the soluble support material comprises $\alpha$-aluminum oxide.

3. The process of claim 1, wherein the ruthenium-comprising catalyst is produced by impregnating the support material with ruthenium(III) chloride solution, drying, and calcination.

4. The process of claim 3, wherein the further working up is carried out and comprises producing fresh catalyst from the ruthenium(III) chloride solution obtained in b) or c).

5. The process of claim 1, wherein the ruthenium-comprising catalyst additionally comprises nickel.

6. The process of claim 5, wherein the aqueous ruthenium (III) chloride solution obtained in b) comprises nickel in dissolved form and this solution is, optionally after concentration, employed for producing fresh catalyst.

7. The process of claim 1, wherein the ruthenium-comprising catalyst is employed in oxidizing hydrogen chloride.

8. The process of claim 2, wherein the ruthenium-comprising catalyst is produced by impregnating the support material with ruthenium(III) chloride solution, drying, and calcination.

9. The process of claim 8, wherein the further working up is carried out and comprises producing fresh catalyst from the ruthenium(III) chloride solution obtained in b) or c).

10. The process of claim 2, wherein the ruthenium-comprising catalyst additionally comprises nickel.

11. The process of claim 3, wherein the ruthenium-comprising catalyst additionally comprises nickel.

12. The process of claim 4, wherein the ruthenium-comprising catalyst additionally comprises nickel.

13. The process of claim 5, wherein the aqueous ruthenium (III) chloride solution obtained in b) comprises nickel in dissolved form and this solution, after concentration, is employed for producing fresh catalyst.

14. The process of claim 10, wherein the aqueous ruthenium(III) chloride solution obtained in b) comprises nickel in dissolved form and this solution, optionally after concentration, is employed for producing fresh catalyst.

15. The process of claim 11, wherein the aqueous ruthenium(III) chloride solution obtained in b) comprises nickel in dissolved form and this solution, optionally after concentration, is employed for producing fresh catalyst.

16. The process of claim 12, wherein the aqueous ruthenium(III) chloride solution obtained in b) comprises nickel in dissolved form and this solution, optionally after concentration, is employed for producing fresh catalyst.

17. The process of claim 2, wherein the ruthenium-comprising catalyst is employed in oxidizing hydrogen chloride.

18. The process of claim 3, wherein the ruthenium-comprising catalyst is employed in oxidizing hydrogen chloride.

19. The process of claim 4, wherein the ruthenium-comprising catalyst is employed in oxidizing hydrogen chloride.

20. The process of claim 5, wherein the ruthenium-comprising catalyst is employed in oxidizing hydrogen chloride.

* * * * *